US009766137B2

(12) United States Patent
Park et al.

(10) Patent No.: US 9,766,137 B2
(45) Date of Patent: Sep. 19, 2017

(54) MAIN CIRCUIT PART OF VACUUM CIRCUIT BREAKER WITH SELF-POWERED TEMPERATURE SENSOR ASSEMBLY

(71) Applicant: LSIS CO., LTD., Anyang-si, Gyeonggi-do (KR)

(72) Inventors: Woo Jin Park, Cheongju-si (KR); Min Kyu Seo, Cheongju-si (KR)

(73) Assignee: LSIS CO., LTD., Anyang-si (KR)

( * ) Notice: Subject to any disclaimer, the term of this patent is extended or adjusted under 35 U.S.C. 154(b) by 469 days.

(21) Appl. No.: 14/463,447

(22) Filed: Aug. 19, 2014

(65) Prior Publication Data
US 2015/0139275 A1    May 21, 2015

(30) Foreign Application Priority Data
Nov. 18, 2013 (KR) .................. 10-2013-0140028

(51) Int. Cl.
G01K 13/00 (2006.01)
G01K 1/14 (2006.01)
H01H 33/66 (2006.01)
H01H 11/00 (2006.01)

(52) U.S. Cl.
CPC ............. G01K 13/00 (2013.01); G01K 1/143 (2013.01); H01H 11/0062 (2013.01); H01H 33/6606 (2013.01); G01K 2215/00 (2013.01); H01H 2011/0068 (2013.01); H01H 2033/6613 (2013.01)

(58) Field of Classification Search
CPC .................................................... G01K 1/024
See application file for complete search history.

(56) References Cited

U.S. PATENT DOCUMENTS

| 7,852,617 | B2 * | 12/2010 | Lee ................... H01H 33/6606 200/540 |
| 7,868,755 | B2 * | 1/2011 | Hanai ................... G01K 1/024 340/539.22 |
| 9,263,659 | B2 * | 2/2016 | Ward ..................... H01L 35/02 |
| 9,472,744 | B2 * | 10/2016 | Moczygemba ......... H01L 35/32 |

(Continued)

FOREIGN PATENT DOCUMENTS

| CN | 201522959 | 7/2010 |
| CN | 202013834 | 10/2011 |

(Continued)

OTHER PUBLICATIONS

Korean Intellectual Property Office Application Serial No. 10-2009-0075883, Notice of Allowance dated Oct. 22, 2015, 2 pages.

(Continued)

*Primary Examiner* — Minh Phan
*Assistant Examiner* — Leon W Rhodes, Jr.
(74) *Attorney, Agent, or Firm* — Lee, Hong, Degerman, Kang & Waimey (57) ABSTRACT

The present invention relates to a main circuit part of a vacuum circuit breaker, and more particularly, to a main circuit part of a vacuum circuit breaker with a temperature sensor. The main circuit part of a vacuum circuit breaker with a self-powered temperature sensor assembly includes: a self-powered temperature sensor module; and a support bracket enclosing and supporting the self-powered temperature sensor module.

8 Claims, 6 Drawing Sheets

(56) References Cited

U.S. PATENT DOCUMENTS

2011/0150036 A1\* 6/2011 Lee .......................... G01K 7/02
374/179
2013/0301674 A1\* 11/2013 Gillette, II ......... G01N 33/0009
374/121

FOREIGN PATENT DOCUMENTS

| CN | 202957190 | 5/2013 |
| EP | 2088609 | 8/2009 |
| JP | 09-063430 | 3/1997 |
| JP | 2003-139621 | 5/2003 |
| JP | 2004-24551 | 1/2004 |
| JP | 04-212645 | 1/2009 |
| JP | 2012112710 A \* | 6/2012 |
| KR | 10-2003-0075832 | 9/2003 |
| KR | 20-2010-0000181 | 1/2010 |
| KR | 10-1279061 | 7/2013 |
| WO | 2013/057925 | 4/2013 |

OTHER PUBLICATIONS

Japan Patent Office Application Serial No. 2014-182874, Office Action dated Jun. 23, 2015, 3 pages.
European Patent Office Serial No. 14181725.4, Search Report dated Mar. 23, 2015, 5 pages.
Korean Intellectual Property Office Application Serial No. 10-2013-0140028, Office Action dated Jan. 14, 2015, 3 pages.

\* cited by examiner

FIG. 1

PRIOR ART

MAIN CIRCUIT PART OF VACUUM CIRCUIT BREAKER WITH SELF-POWERED TEMPERATURE SENSOR ASSEMBLY

CROSS-REFERENCE TO RELATED APPLICATION

Pursuant to 35 U.S.C. §119(a), this application claims the benefit of earlier filing date and right of priority to Korean Application No. 10-2013-0140028, filed on Nov. 18, 2013, the contents of which are all hereby incorporated by reference herein in its entirety.

BACKGROUND OF THE INVENTION

1. Field of the Invention

The present invention relates to a main circuit part of a vacuum circuit breaker, and more particularly, to a main circuit part of a vacuum circuit breaker with a temperature sensor.

2. Description of the Conventional Art

In general, a vacuum circuit breaker is a circuit breaker installed in a high voltage electric power system to break a circuit to protect the electric power system in the event of a dangerous situation such as a short circuit, an overcurrent, and the like, and it is designed by utilizing excellent insulating performance and arc-extinguishing capability in a vacuum state.

Figure 1:
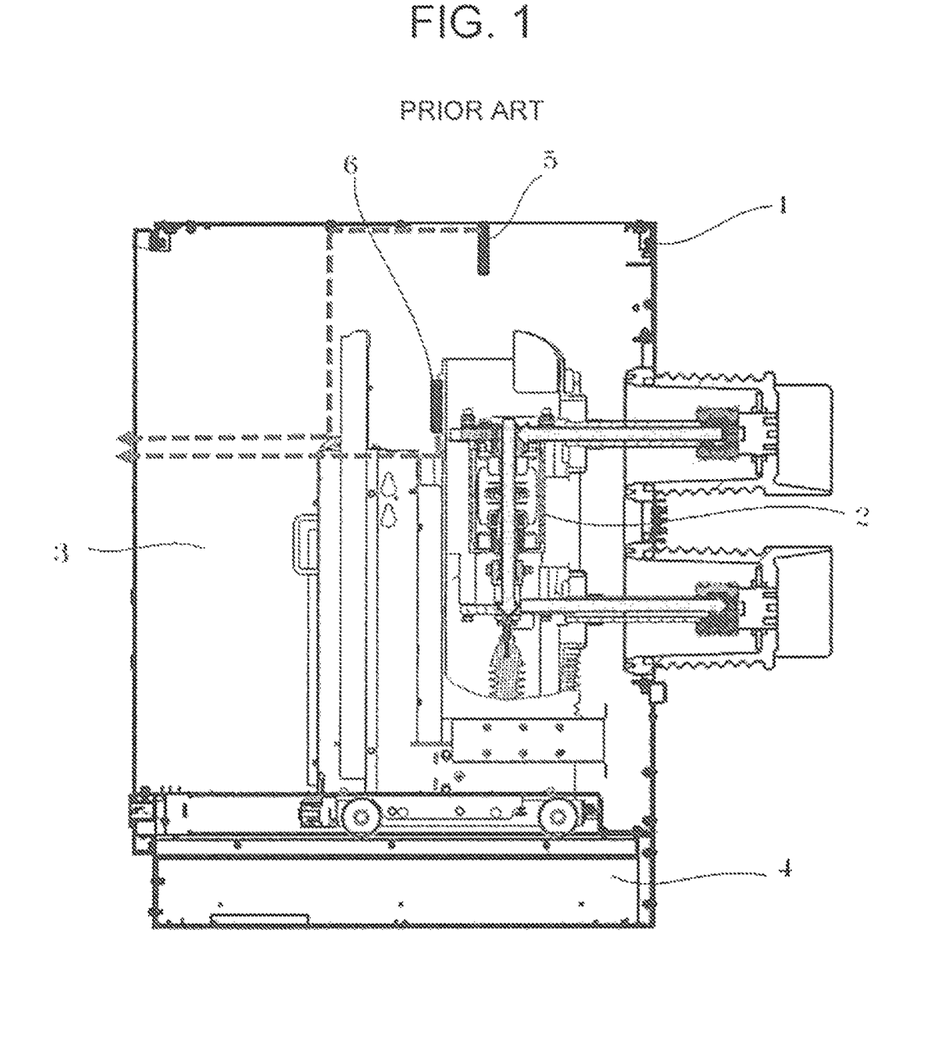
FIG. 1 is a side view illustrating a main body of a vacuum circuit breaker according to the conventional art.

FIG. 1 is a side view illustrating a main body of a vacuum circuit breaker according to the conventional art. The main body 1 of the vacuum circuit breaker generally includes a main circuit part 2, an operation part 3, and a transfer part 4. Among them, the part essential for applying or cutting off a circuit voltage or current is the main circuit part 2.

As a large current flows in the main circuit part 2, heat is generated. The amount of heat generation is very large in the event of a fault current, and this may cause a problem with the normal operation of the breaker's main body 1 or damage to internal parts or load devices. To avoid situations like this, a temperature monitoring apparatus was developed to measure the temperature of the main circuit part 2.

As a prior art related to this type of apparatus, Korean Patent Registration No. 10-0883042 titled 'Air Circuit Breaker with Temperature Sensor' may be referred. This invention relates to an air circuit breaker with a temperature sensor which can monitor the temperature of the circuit breaker based on the current flowing in a conduction unit of the air circuit breaker. The air circuit breaker with a temperature sensor according to an exemplary embodiment of this invention includes a temperature sensor 150 which is inserted into a sensor insertion hole 115 formed in a base mold 110 and measures temperatures and a temperature indicator 160 which indicates the temperature of the current-carrying part with a measurement made by the temperature sensor 150.

In order to measure the amount of heat the main circuit part 2 of the conventional vacuum circuit breaker generates, as in the above prior art example, a temperature sensor 5 may be installed in the air to measure the upper-air temperature of the main body 1 where the main circuit part's heat is transferred via convection (case A), or a temperature sensor 6 may be configured to come into contact with a mold housing or insulator to indirectly measure the temperature of heat transferred (case B).

This is because a cable for power supply and a cable for data communication are necessarily connected to the temperature sensor 5 or 6. That is, a power cable is connected to the temperature sensor 5 or 6 to supply power, and a data cable is connected to the temperature sensor 5 or 6 to transmit data measured by the temperature sensor 5 or 6 to an external device. It is hard for these cables to bear high-temperature heat generated from the main circuit part 2. Also, forming various types of cables within the main body 1 in a complicated manner may cause a deterioration of insulation performance and bring disadvantages in terms of spatial design.

For this reason, a temperature sensor has been installed in proximity to the main circuit part 2 in the same way as shown in FIG. 1, which, however, decreases the accuracy of data measured by the temperature sensor installed in this way. This makes it difficult to accurately measure the temperature of the main circuit part 2 and gain practical benefits of monitoring. As a consequence, there still is a possibility that the main body 1 and peripheral equipment will get damage.

Moreover, the cable connected to the temperature sensor has to be pulled out to the front even when the temperature is installed directly on the main circuit part 2 to accurately measure the temperature of the main circuit part 2, which creates the possibility of insulation breakdown and failure due to the cable connected to the temperature sensor.

SUMMARY OF THE INVENTION

Therefore, the present invention has been made in an effort to solve the above-mentioned problems and provide a temperature sensor assembly which can be installed directly on a main circuit part of a vacuum circuit breaker.

To achieve these and other advantages and in accordance with the purpose of this specification, as embodied and broadly described herein, there is provided a main circuit part of a vacuum circuit breaker with a self-powered temperature sensor assembly, including: a self-powered temperature sensor module; and a support bracket enclosing and supporting the self-powered temperature sensor module.

The main circuit part further includes a radiator fin that is integrally attached to terminals, wherein the self-powered temperature sensor module is placed on a mounting part that is formed as a flat base at the center of the radiator fin.

The self-powered temperature sensor module includes a temperature measurement part and a wireless communication module.

The self-powered temperature sensor module includes a sensor radiator fin at the top of the temperature measurement part.

The support bracket includes a body part and support wings, and the body part is shaped like a box, the bottom of which is fully opened and the front, rear, top, and sides are partially opened.

The main circuit part further includes an upper fixing plate and a lower fixing plate that enclose and support the wireless communication module.

The support bracket, the lower fixing plate, and the upper fixing plate are formed of a non-magnetic material.

The upper fixing plate extends to the temperature measurement part and is attached to the support bracket.

An insulative, shock-absorbing spacer is interposed between the wireless communication module and the upper fixing plate or between the wireless communication module and the lower fixing plate.

The self-powered temperature sensor module may produce an electromotive force by itself using a temperature difference between the top and bottom of the temperature measurement part.

According to a main circuit part of a vacuum circuit breaker with a self-powered temperature sensor assembly according to an embodiment of the present invention, a temperature sensor may be installed in direct contact with the upper terminal or lower terminal of the main circuit part. Accordingly, the temperature at the terminals of the main circuit part can be accurately measured.

Moreover, as various kinds of cables connected to the temperature sensor are omitted, high insulation performance can be achieved.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Hereinafter, a preferred embodiment of the present invention will be described in detail with reference to the accompanying drawings. It should be understood that the embodiment will be described for illustrative purposes only so that those skilled in the art can easily work the present invention and does not limit the technical spirit and scope of the invention.

A main circuit part of a vacuum circuit breaker with a self-powered temperature sensor assembly according to an embodiment of the present invention includes: a self-powered temperature sensor module 25 installed on part of terminals of the main circuit part; and a support bracket 30 enclosing and supporting the self-powered temperature sensor module 25.

Figure 2:
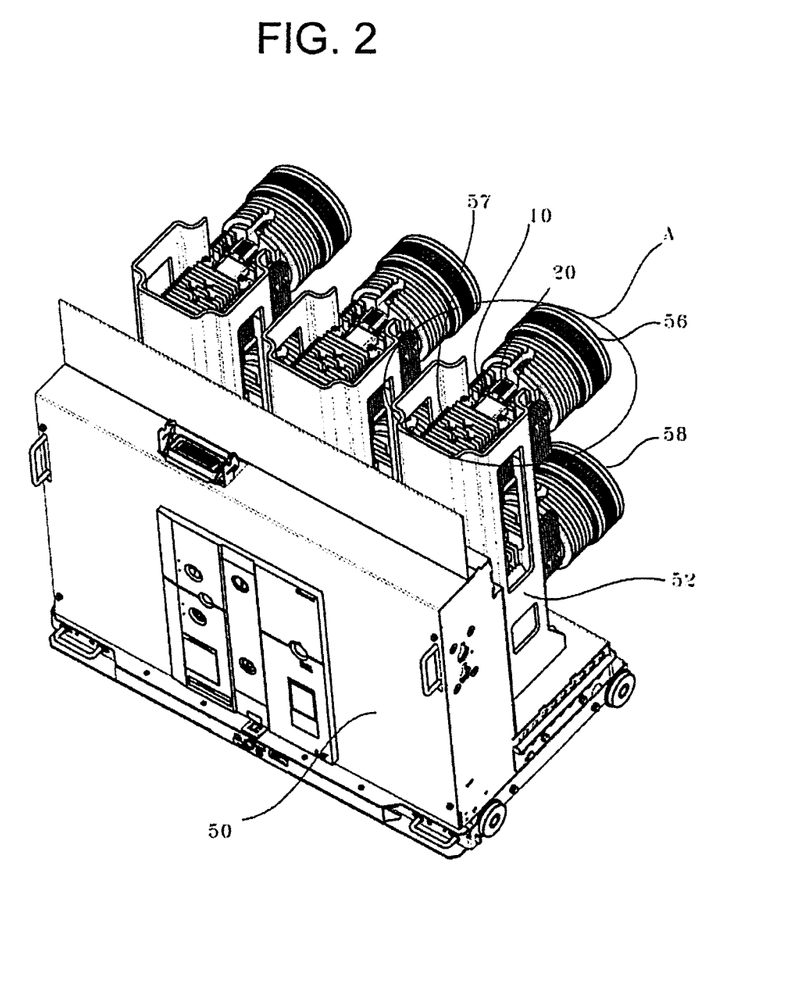
FIG. 2 is a perspective view of a vacuum circuit breaker with a self-powered temperature sensor assembly according to an embodiment of the present invention.
Figure 3:
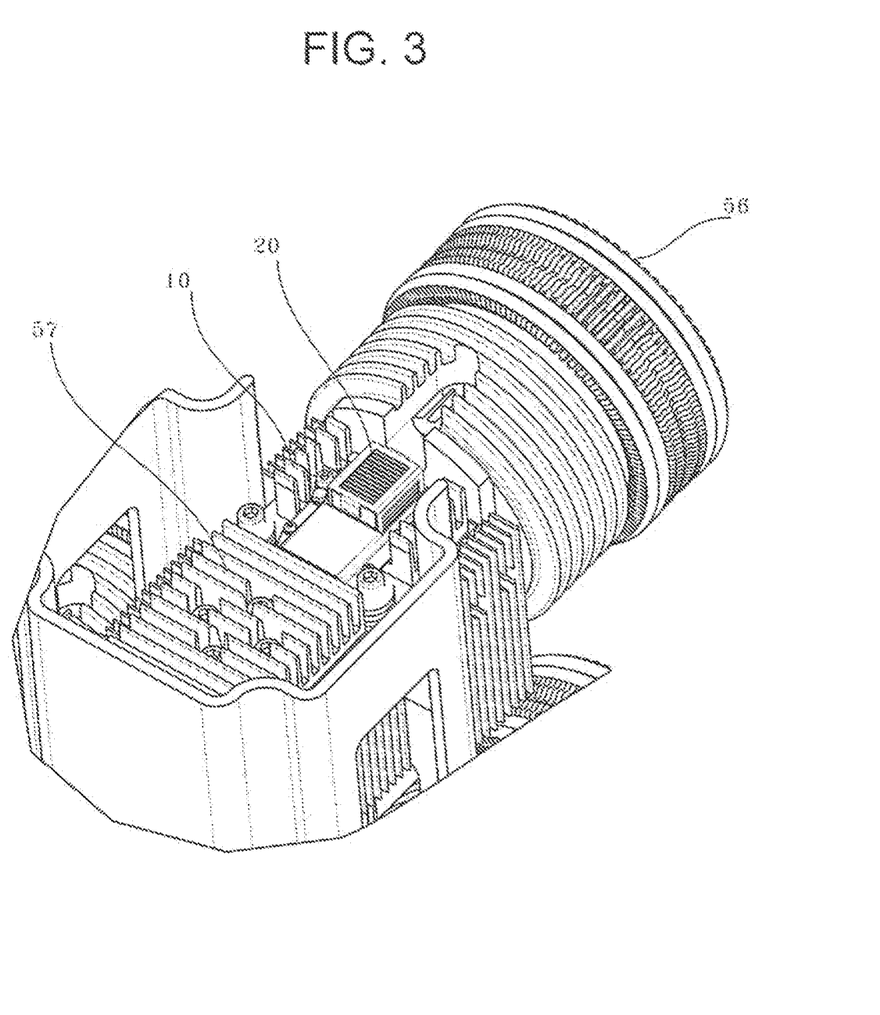
FIG. 3 is a partial detailed view of A of FIG. 2.
Figure 4:
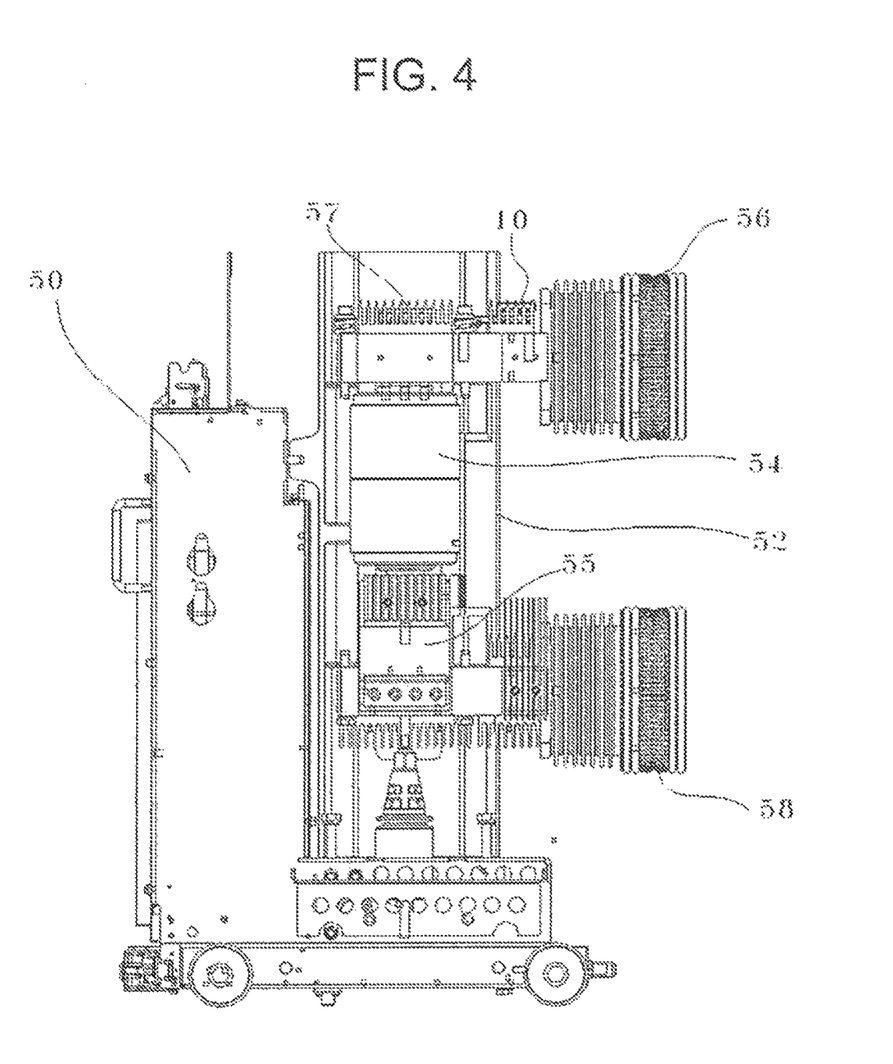
FIG. 4 is a side view of FIG. 2.
Figure 5A:
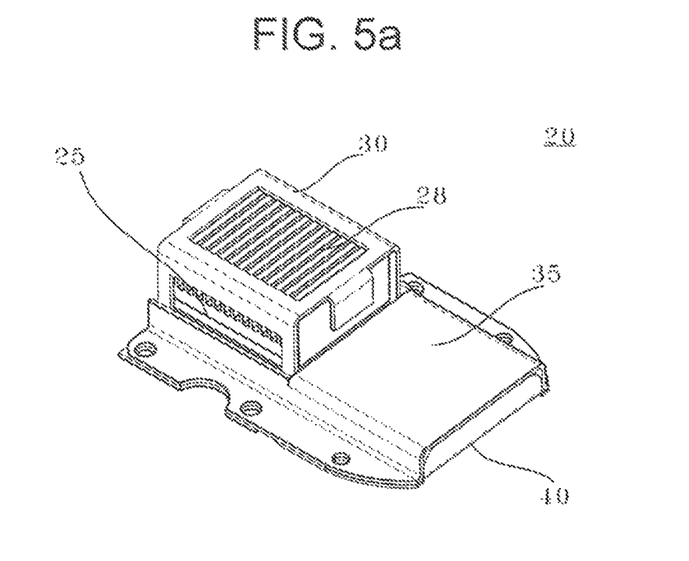
FIG. 5a illustrates a self-powered temperature sensor assembly according to an embodiment of the present invention.
Figure 5B:
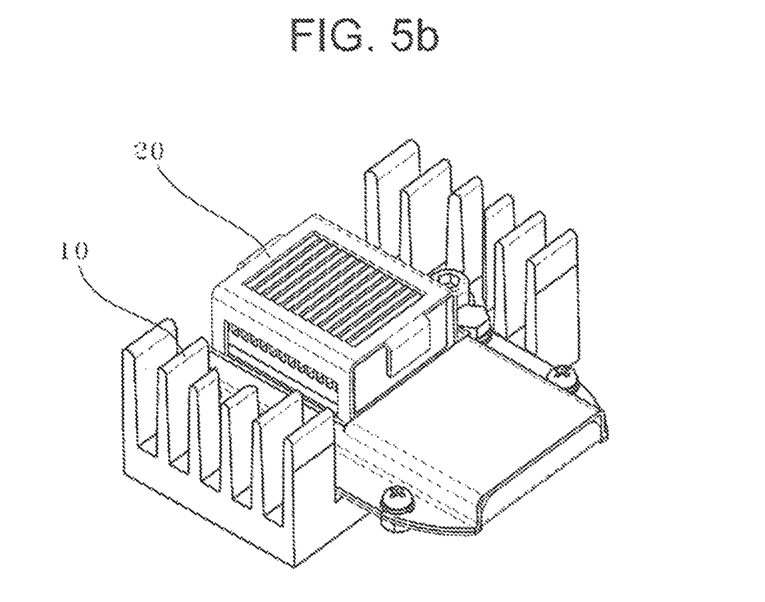
FIG. 5b illustrates the self-powered temperature sensor assembly of FIG. 5a being attached to a radiator fin.
Figure 6:
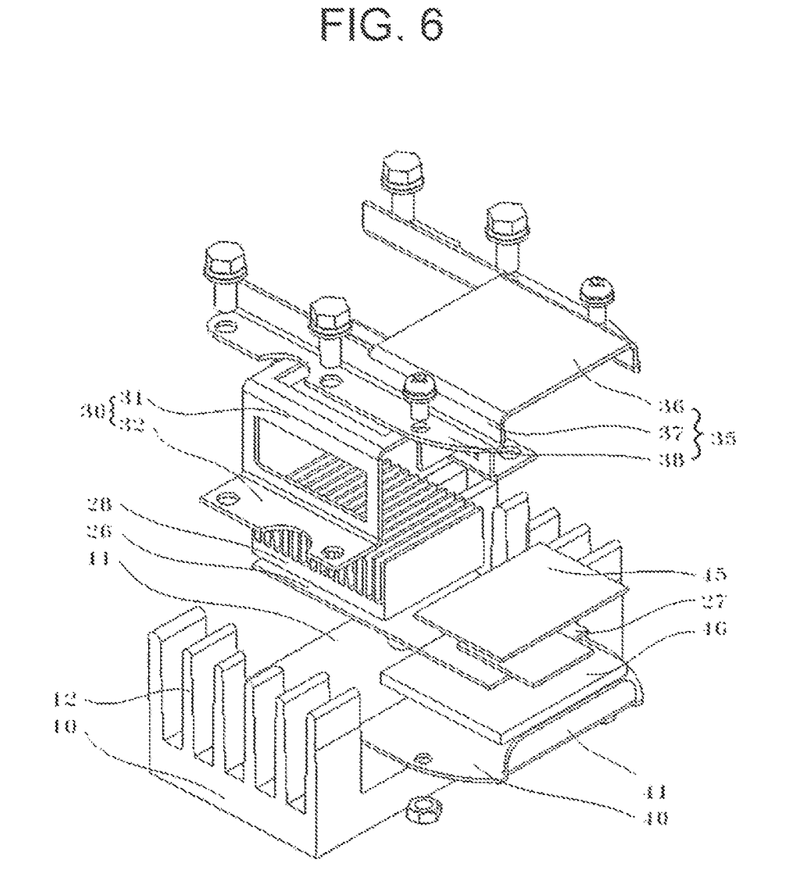
FIG. 6 is an exploded perspective view of FIG. 5b.

FIG. 2 is a perspective view of a vacuum circuit breaker with a self-powered temperature sensor assembly according to an embodiment of the present invention. FIG. 3 is a partial detailed view of A of FIG. 2. FIG. 4 is a side view of FIG. 2. FIG. 5a illustrates a self-powered temperature sensor assembly according to an embodiment of the present invention. FIG. 5b illustrates the self-powered temperature sensor assembly of FIG. 5a being attached to a radiator fin. FIG. 6 is an exploded perspective view of FIG. 5b. An embodiment of the present invention will be described in detail with reference to the drawings.

FIG. 2 depicts a main body 50 of the vacuum circuit breaker. An upper terminal 56 and a lower terminal 58 protrude from the main circuit part 52. A radiator fin 57 is attached to each of the terminals 56 and 58 to efficiently release heat generated by large-current conduction. As for the basic flow of current, a current entering the power supply side goes out to the lower terminal 58 through the upper terminal 56 and a vacuum interrupter 54 and is connected to a load. A flexible shunt 55 may be interposed between the vacuum interrupter 54 and the lower terminal 58 to provide a flexible clearance for moving a movable part of the vacuum interrupter 54.

The main circuit part 52 of this type is usually provided in three phases (R phase, S phase, and T phase) on the main body 50, and only one of the three phases will be described because the three phases are formed and work in the same manner.

A radiator fin 10 is integrally attached to the upper terminal 56 or the lower terminal 58. The radiator fin 10 may be a modification of the existing radiator fin 57. The radiator fin 10 may have an angular U-shape. A mounting part 11 comprising a flat base is formed at the center of the radiator fin 10. A plurality of finned parts 12 are formed on both sides of the mounting part 11. The radiator fin 10 is preferably formed of a highly heat-conductive material, like aluminum.

The self-powered temperature sensor assembly 20 is attached to the radiator fin 10. The self-powered temperature sensor assembly 20 to be applied to an embodiment of the present invention may be optionally installed, together with the radiator fin 10, on the upper terminal 56 or the lower terminal 58. The self-powered temperature sensor assembly 20 is equipped with a self-powered temperature sensor module 25. The self-powered temperature sensor module 25 includes a temperature measurement part 26 and a wireless communication module 27. The temperature measurement part 26 directly measures the temperature of heat generated by the current flowing in the upper terminal 56 or lower terminal 58 of the main circuit part 55. Accordingly, the temperature of heat generated from each of the terminals 56 and 58 can be accurately measured without error.

The temperature measurement part 26 can operate without a power supply unit, an example of which may include a self-powered approach using a temperature difference. That is, the temperature measurement part 26 may produce an electromotive force by itself using a temperature difference between the top and bottom of the temperature measurement part 26.

To this end, a sensor radiator fin 28 may be provided at the top of the temperature measurement part 26. The sensor radiator fin 28 causes heat generated from the temperature measurement part 26 to be released, thereby making the temperature at the top lower than the temperature at the bottom.

The wireless communication module 27 is capable of wireless data communication with the outside (receiver). For this wireless communication, an RF (radio frequency) module may be used. Besides, a variety of technologies for short-range communications, such as IrDA, Bluetooth, wireless LAN, Wibro, etc may be used. The wireless communication 27 may transmit data measured by the temperature measurement part 26 to different types of receivers for users, such as an external switchboard or laptop computer, to enable the processing and control of this data according to settings. Accordingly, processing and controlling equipment may perform control operations, such as indicating numerical values on a display part or sounding an alarm or automatically operating the circuit breaker when the temperature rises to more than a set temperature. With the use of the wireless communication module 27, no cable for connection to the outside (receiver) is required. This can eliminate the space needed for cables, facilitate spatial design, and improve insulation performance. Moreover, as various kinds of cables connected to the temperature sensor are omitted, there is no risk of accidents such as a fire and desired effects can be obtained in terms of cost reduction.

Although not shown, the self-powered temperature sensor module 25 may be further equipped with a processor for processing data between the temperature measurement part 26 and the wireless communication module 27.

The support bracket 30 is provided to fixedly support the self-powered temperature sensor module 25 and the sensor radiator fin 28. The support bracket 30 may be formed of a box-shaped body part 31 and support wings 32 extending laterally from the bottom end of the body part 31. The bottom of the body part 31 is fully opened, its front and rear are opened, except for some part, and the top and sides are opened, except for the outer frame. This is to guarantee the maximum performance of the sensor radiator fin 28 enclosed by the body part 31. The support wings 32 have a plurality of screw holes so as to be fixedly attached to the radiator fin 10.

An upper fixing plate 35 and a lower fixing plate 40 are provided to enclose and support the wireless communication module 27.

The upper fixing plate 35 may be formed of an upper side 36 large enough to enclose and cover the wireless communication module 27 and lateral sides 37 of a predetermined height. Supporting faces 38 may be bent at and extend from the bottom of the lateral sides 37, and the supporting faces 38 may have screw holes. The lateral sides 37 and the supporting faces 38 may extend rearward to the temperature measurement part 26. Accordingly, the upper fixing plate 35, together with the support bracket 30, may be fixedly installed on the radiator fin 10.

According to some embodiments, the support bracket 30 and the upper fixing plate 35 may be integrally formed.

The lower fixing plate 40 may have a width corresponding to the upper side 36 and supporting faces 38 of the upper fixing plate 35, and include a front side 41.

By the upper fixing plate 35 and the lower fixing plate 40, the wireless communication module 27 is stably protected and perform its function.

Preferably, the support bracket 30, the upper fixing plate 35, and the lower fixing plate 40 are formed of a non-magnetic material to minimize its effect on insulation performance. Moreover, the support bracket 30, the upper fixing plate 35, and the lower fixing plate 40 must have sufficient bearing capacity. An example of this material includes a stainless steel base metal. Accordingly, any malfunction which may occur due to heat generated from the temperature measurement part 26 and the wireless communication module 27 and a magnetic force formed around them can be prevented.

An insulative, shock-absorbing spacer 45 may be interposed between the wireless communication module 27 and the upper fixing plate 35. A spacer 46 may be interposed between the wireless communication module 27 and the lower fixing plate 40. These spacers 45 and 46 may be of a Teflon synthetic resin to provide high insulation performance.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

What is claimed is:

1. A main circuit part of a vacuum circuit breaker with a self-powered temperature sensor assembly, the main circuit part comprising:
    a self-powered temperature sensor module installed as part of a main circuit part terminal; and
    a support bracket enclosing and supporting the self-powered temperature sensor module, wherein:
    the self-powered temperature sensor module comprises a temperature measurement part, a wireless communication module, and a sensor radiator fin at a top of the temperature measurement part;
    the temperature measurement part produces an electromotive force using a difference between a temperature at the top of the temperature measurement part and a temperature at a bottom of the temperature measurement part without a power supply unit; and
    the self-powered temperature sensor module is located on a mounting part formed as a flat base at a center of the radiator fin.

2. The main circuit part of claim 1, wherein the support bracket includes a boxed-shaped body part and support wings, a bottom of the body part fully open and front, rear, top, and sides of the body part partially open.

3. The main circuit part of claim 1, further comprising an upper fixing plate and lower fixing plate enclosing and supporting the wireless communication module.

4. The main circuit part of claim 3, wherein the support bracket, the lower fixing plate, and the upper fixing plate are formed of a non-magnetic material.

5. The main circuit part of claim 3, wherein the upper fixing plate extends to the temperature measurement part and is attached to the support bracket.

6. The main circuit part of claim 3, further comprising an insulating, shock-absorbing spacer is interposed between the wireless communication module and the upper fixing plate or between the wireless communication module and the lower fixing plate.

7. The main circuit part of claim 1, wherein the temperature measurement part is in direct contact with an upper terminal and a lower terminal of the main circuit part and directly measures temperature of the upper terminal and the lower terminal.

8. The main circuit part of claim 1, wherein the sensor radiator fin causes heat generated by the temperature measurement part to be released such that the temperature at the top of the temperature measurement part is lower than the temperature at the bottom of the temperature measurement part.

* * * * *